United States Patent
Soofi et al.

(10) Patent No.: US 12,050,668 B1
(45) Date of Patent: Jul. 30, 2024

(54) METHOD AND SYSTEM FOR OBFUSCATING AND PROTECTING GAME LOGIC AND VARIABLES DURING VIDEO GAME COMPILATION

(71) Applicant: Take-Two Interactive Software, Inc., New York, NY (US)

(72) Inventors: Amir Soofi, New York, NY (US); Claudiu Dumitru, Oakville (CA); Miguel Arroyo, Irvine, CA (US)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 18 days.

(21) Appl. No.: 17/571,404

(22) Filed: Jan. 7, 2022

Related U.S. Application Data (60) Provisional application No. 63/135,453, filed on Jan. 8, 2021.

(51) Int. Cl.
*G06F 21/14* (2013.01)
*A63F 13/71* (2014.01)
*G06F 8/41* (2018.01)
*G06F 8/54* (2018.01)
*G06F 21/10* (2013.01)

(52) U.S. Cl.
CPC .............. *G06F 21/14* (2013.01); *A63F 13/71* (2014.09); *G06F 8/425* (2013.01); *G06F 8/443* (2013.01); *G06F 8/54* (2013.01); *G06F 21/1062* (2023.08)

(58) Field of Classification Search
CPC .......... G06F 21/14; G06F 8/425; G06F 8/443; G06F 21/1062; G06F 8/40–54; A63F 13/71
See application file for complete search history.

(56) References Cited

U.S. PATENT DOCUMENTS

| | | | | |
|---|---|---|---|---|
| 9,027,075 | B2* | 5/2015 | Driscoll | G06F 21/54 726/1 |
| 9,116,712 | B2* | 8/2015 | Miller | G06F 8/70 |
| 9,471,288 | B2* | 10/2016 | Miller | G06F 8/70 |
| 10,127,160 | B2* | 11/2018 | Gounares | G06F 12/1408 |
| 10,481,996 | B2* | 11/2019 | Gorbaty | G06F 11/36 |
| 10,877,748 | B2* | 12/2020 | Bucuvalas | G06F 8/36 |
| 10,904,291 | B1* | 1/2021 | Naumann | H04L 63/20 |
| 2010/0083240 | A1* | 4/2010 | Siman | G06F 16/245 717/144 |
| 2013/0014275 | A1* | 1/2013 | Goodes | G06F 9/44521 719/331 |
| 2013/0086625 | A1* | 4/2013 | Driscoll | G06F 8/40 726/1 |

(Continued)

OTHER PUBLICATIONS

Yi, Jiajia, et al. "A security model and implementation of embedded software based on code obfuscation." 2020 IEEE 19th International Conference on Trust, Security and Privacy in Computing and Communications (TrustCom). IEEE, 2020. (Year: 2020).*

(Continued)

*Primary Examiner* — Matthew J Brophy
(74) *Attorney, Agent, or Firm* — Orrick, Herrington & Sutcliffe LLP (57) ABSTRACT

A system and method for producing video games in order to prevent cheating in a video game environment by obfuscating game logic and variables during compilation.

20 Claims, 8 Drawing Sheets

(56) References Cited

U.S. PATENT DOCUMENTS

| | | | | |
|---|---|---|---|---|
| 2019/0377559 A1* | 12/2019 | Strosaker | ................ | G06F 8/427 |
| 2020/0050449 A1* | 2/2020 | Bucuvalas | ................ | G06F 8/36 |
| 2020/0151305 A1* | 5/2020 | Lam | ................ | G06F 8/41 |
| 2022/0121429 A1* | 4/2022 | Haile | ................ | G06N 3/08 |
| 2023/0079426 A1* | 3/2023 | Ferguson | ................ | G06F 8/443 |
| | | | | 717/140 |

OTHER PUBLICATIONS

Junod, Pascal, et al. "Obfuscator-LLVM—software protection for the masses." 2015 IEEE/acm 1st international workshop on software protection. IEEE, 2015. (Year: 2015).*

* cited by examiner

METHOD AND SYSTEM FOR OBFUSCATING AND PROTECTING GAME LOGIC AND VARIABLES DURING VIDEO GAME COMPILATION

CROSS-REFERENCE TO RELATED APPLICATIONS

This application claims priority to U.S. Provisional Application Ser. No. 63/135,453, which was filed Jan. 8, 2021, the disclosure of which is hereby incorporated by reference in its entirety and for all purposes.

FIELD

The present disclosure relates generally to security provisions for computer programs and more particularly to systems and methods for more efficiently developing secure video games, including systems and methods for providing security measures during compilation.

BACKGROUND

Cheating in video games is an ongoing problem in the game development industry. Unscrupulous players can cheat in several ways, ranging from technical hacks of the game to engaging in poor sportsmanship. For example, on the technical side, a player might use memory-editing software to teleport a character around the game map, change player attributes (e.g., health), or spawn powerful items to gain an unfair advantage in the game. Video game players may seek to manipulate (or otherwise hack) the software and/or data of the game in order to (a) acquire unauthorized in-game content, (b) create/maintain an unfair advantage in relation to the other players, and (c) circumvent security mechanisms placed in the game. For example, a player looking to gain one of these advantages may monitor the games' memory during game play to identify where in memory certain useful program (e.g., crown jewel) variables are stored. Examples of these useful program variables include the player's health, ammunition count, in-game-currency, etc. If the locations of these variables are found in memory, their values can be illegitimately changed using direct memory manipulation techniques. This would, for example, (a) enable a player to teleport to anywhere in the game world, by modifying the value of their coordinates, (b) enable a player to make themselves invulnerable by continuously setting their health value to the maximum every microsecond, (c) enable a player to modify the value of a damage multiplier to give them an unfair advantage against other players, and more similar attacks that disrupt an otherwise honest gaming experience, and (d) execute functionality not typical in normal gameplay (e.g., calling game code or scripts designed to support developer troubleshooting or debugging). Similarly, unscrupulous players can cheat by modifying the software, or logic of the video game to gain unfair advantages. For example, a player could add logic that automatically aims the player's weapon at the player's enemies or remove game logic that puts an upper limit on a player's health or speed.

In an attempt to prevent players from easily identifying the location or value of important game logic or variables, developers of conventional games create systems to encrypt, encode, obfuscate, validate and/or transform those elements. These encryptions, encodings, obfuscations, validations, and/or transformations are generally called protection transforms or protection transformations.

Figure 1:
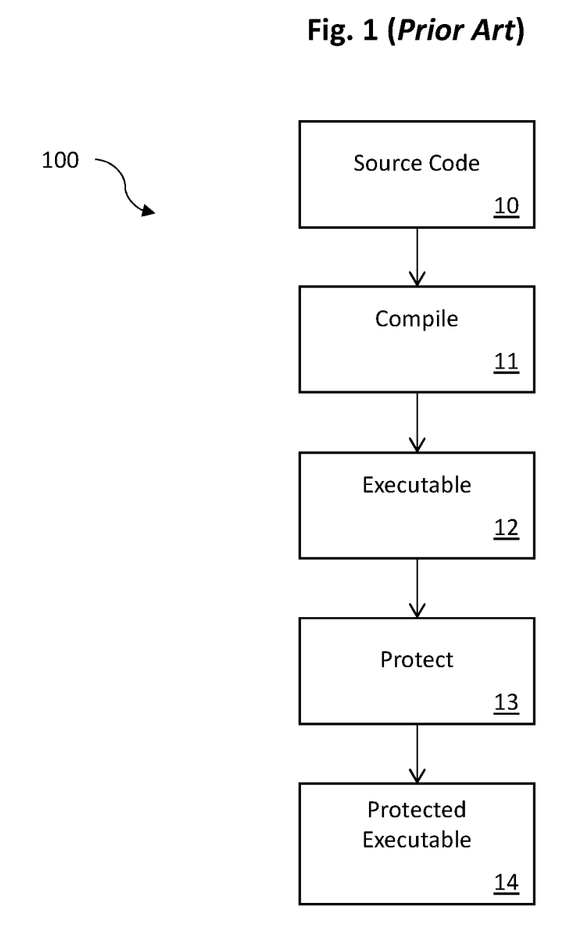
FIG. 1 illustrates an exemplary flow diagram of a prior art security measure injection process.

Conventional protection transforms, however, are applied after a game has been already been compiled into a binary or executable (e.g., comprising bits (0s or 1s)). The executable or binary is analyzed and protection transforms, including examples such as checksums, anti-tampering mechanisms, obfuscation, and more, are applied to and/or inserted into the binary. FIG. 1 illustrates an exemplary flow diagram depicting how prior art security systems 100 apply their protection transformations. Software engineers produce source code 10, written in high level programming languages like C, C++, Python, or Java. The compiler 11 then compiles the source code 10 and produces a binary or executable 12 for a target instruction set architecture. Then, after the game is in executable form 12, prior art security systems apply their protection transformations 13 to produce an obfuscated and/or protected executable 14.

These systems, however, have many disadvantages. First, conventional security systems operate on compiled binaries or executables 12. As a result, these systems must decompile and/or disassemble an already compiled binary or executable 10 and must rely on fuzzy or imprecise guesses about how the code executes, thereby limiting the protection transformations that can be applied. Even further, certain types of variables, especially certain representations of numbers, cannot be protected even if the value is critical to the functioning of the game executable.

Second, these systems can only operate on a complete executable and on a single machine, acting as a bottleneck during development. During video game development, software engineers must test the modifications they make to their source code 10 by compiling and creating an executable for testing. As the amount of source code 10 for a video game increases, the time it takes to compile the code for testing also increases. Video game developers have reduced this time by developing distributed compilation schemes that allow compilation to occur in parallel over a plurality of computers. Nevertheless, despite developments for distributed compilation, conventional security systems are not able to take advantage of these distributed computation schemes because they only operate on a monolithic executable after compilation.

Third, conventional security systems offer weaker protections that are easier to identify and defeat for the dedicated, but unscrupulous player. Because the security systems work on completed binaries or executables 12, the protection transformations they apply are easily identified in the final executable. There are often chunks of protected code that can be easily distinguished from the unprotected code, making the protected code easier to identify. Dedicated cheaters can then either a) analyze inputs and outputs or b) identify common patterns left behind by conventional protection mechanisms to try to reverse engineer the function of the obfuscated code or simply find ways to circumvent the protected code altogether. Finally, because the security measures are applied directly to executables 12, they cannot be custom tailored for the specific game or for the specific genre of game. The security measures must take a more one size fits all approach, limiting their capabilities.

Accordingly, there is a need for systems and methods for safeguarding video games during compilation in an effort to overcome the aforementioned obstacles and deficiencies of conventional video game systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF PREFERRED EMBODIMENTS

Figure 2:
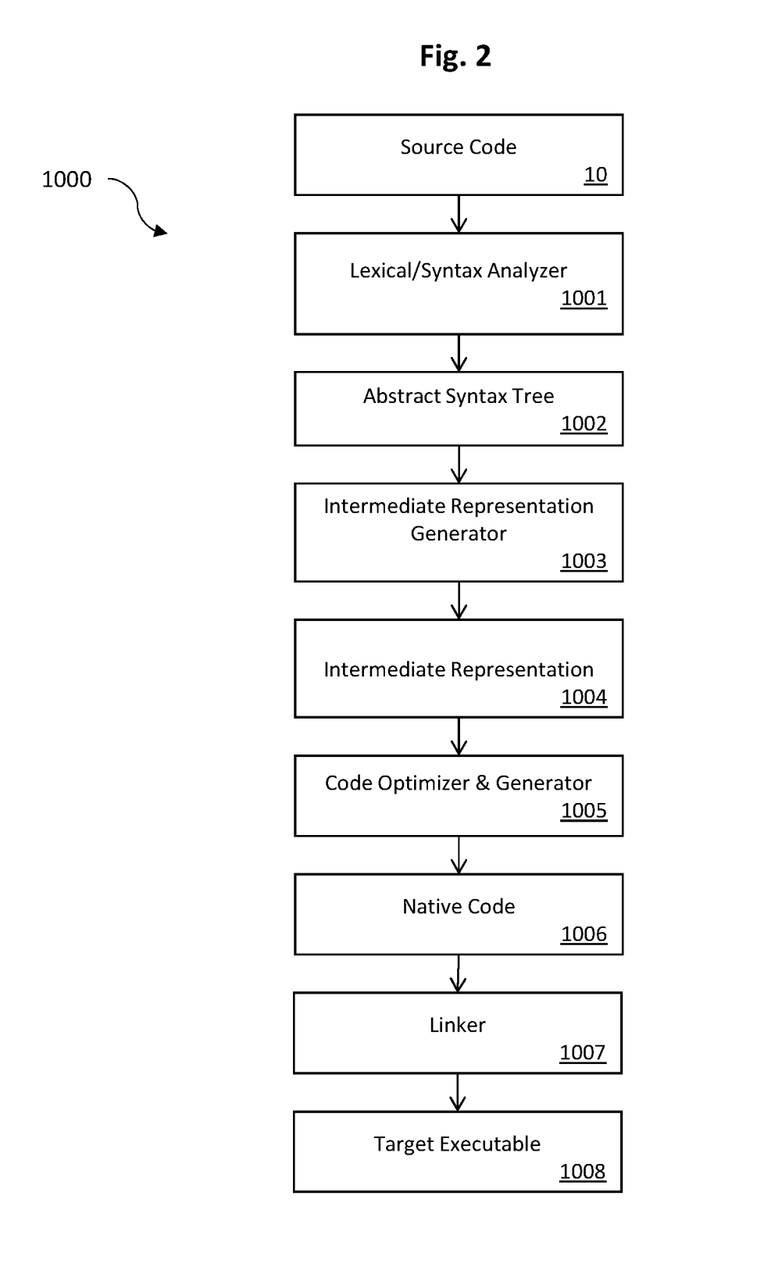
FIG. 2 is an exemplary top-level flow diagram illustrating an embodiment of a security-based compilation process.

As previously discussed, currently-available security systems are deficient because they only operate on compiled executables on a single machine. The number and type of protection transformations are thereby limited and any attempt for security is easily identifiable to the naked eye. Accordingly, a security-based compilation system that implements security measures during development and applies them during the compilation process can prove desirable and provide a basis for a wide range of software applications. This result can be achieved, according to one embodiment disclosed herein, by an exemplary compilation process 1000 as illustrated in FIG. 2. Turning to FIG. 2, the compilation process 1000 begins by transforming the source code 10 into a target executable 1008. The source code 10 can be written in a high-level programming language that is easier for humans to write and understand. For example, software engineers can choose from several popular languages like C, C++, Java, Python, C#, Rust, or myriad others depending on their goals and needs. Once software engineers have completed development, the source code 10 is transformed through several processes.

The compilation process 1000 can generally be split into three stages: a front end, a middle end, and a back end of a compiler toolchain. The front end of the compiler toolchain takes in source code 10 written in a high-level programming language. The front end is also responsible for producing an intermediate representation (IR) 1004 that contains the substance of the source code 10 but in a different form that is amenable to optimization. The front end of the compiler toolchain is generally designed for a specific programming language or family of programming languages but can produce a modular and independent IR 1004.

The middle end of the compiler toolchain takes in the IR 1004 as input and performs a series of optimizations on the IR 1004. As the IR 1004 is no longer tied to any specific programming language in the source code 10, the middle end of the compiler toolchain can be created independently and can exhibit a modular design that allows for easy interchangeability.

The back end of the compiler toolchain takes in the IR 1004 and is responsible for any optimizations that are specific to a target instruction set architecture, like x86, x64, or ARM, and for code generation. For example, the back end includes the linker, which is responsible for producing the final target executable 1008 by linking together all the necessary binary files and libraries required for the final program. As with the front end and middle end, the back end of the compiler toolchain can be designed to operate in a modular fashion with respect to the other parts of the compiler toolchain. For example, it is possible for software engineers to write their source code 10 in a specific programming language, use the front end and middle end of the compiler toolchain to produce an optimized IR 1004, then feed the IR 1004 to several different back ends that will produce executables suitable for different target instruction sets, like for a desktop computer running x86 or a mobile computing device on ARM.

In some embodiments, the front end of the compiler toolchain includes at least a Lexical Analyzer 1001 and Syntax Analyzer 1001. The Lexical Analyzer 1001 takes the source code 10 and converts it into a sequence of tokens, or strings of characters. Next, the Syntax Analyzer 1001 analyzes the source code 10 to determine the relationships between the tokens in the source code 10 and stores the relationship in a data structure. Commonly, an abstract syntax tree 1002, such as shown in FIG. 2, is used. The abstract syntax tree 1002 is a tree data structure where the vertices are comprised of tokens and the edges represent the syntactical relationships between tokens. The abstract syntax tree 1002 is then input into an intermediate representation generator 1003, which produces an intermediate representation (IR) 1004 in a form convenient for optimization in a code optimizer 1005.

At this stage, the IR 1004 is passed to the middle end of the compiler toolchain for optimizations. After several iterations of applying optimizations on the IR 1004, the IR 1004 is passed into the back end of the compiler toolchain. In the back end, a code generator 1005 transforms the IR 1004 into native code 1006. The native code 1006 can include machine code and/or be composed of object files, and is sent to a linker 1007 to bundle the object files and any other required libraries and creates a suitable executable for a target instruction set architectures 1008, like x86, x64, or ARM.

Figure 3:
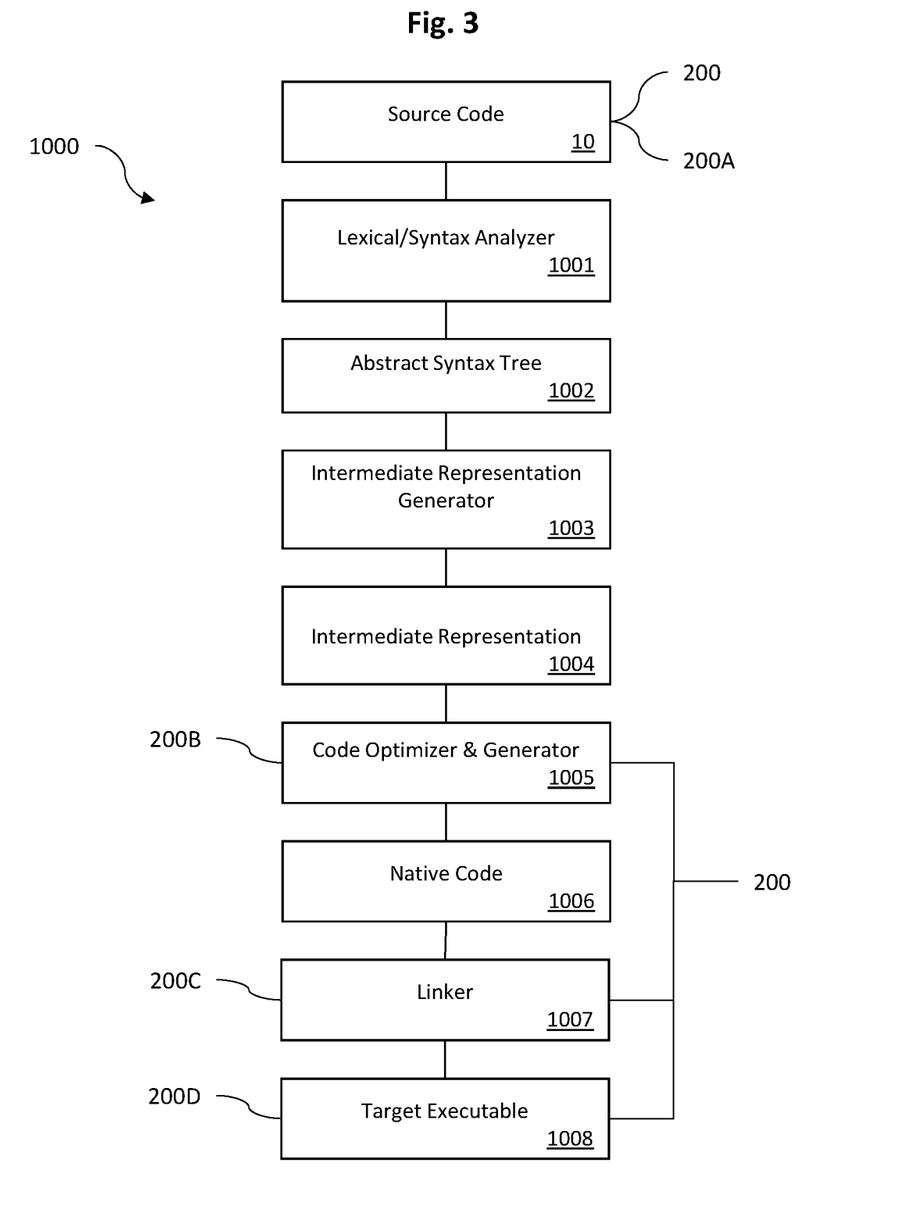
FIG. 3 is an exemplary top-level flow diagram illustrating one embodiment of a process for injecting security measures at one or more possible injection points into the security-based compilation process of FIG. 2.

In some embodiments, one or more injection points 200 into the compilation process 1000 can be used to apply security measures where advantageous, such as shown in FIG. 3. Turning to FIG. 3, an exemplary injection point 200B occurs at the code optimizer 1005, where the compiler applies optimizations, usually in sequence, on the intermediate representation 1004. Here, the protection transformations can be applied directly on the intermediate representation 1004. This advantageously results in executable files where the security measures are incorporated with the game code and logic, making it much more difficult for unscrupulous players to identify and attack the security measures.

In another example, an exemplary injection point 200C is at the linker 1007, which bundles object files and produces executables suitable for target instruction set architectures 1008. Here, security measures that are targeted for specific architectures can also be incorporated during the linking and executable creation process. For example, a game that is going to run on a mobile device likely using the ARM instruction set might require different security measures than a game that runs on a desktop computer using the x64 instruction set. Another exemplary injection point 200A is at the source code 10 prior to being transformed through the compilation process 1000. Injections at the source code 10 occur as security software engineers are actively developing and creating the video game. Security measures identify specific problematic design patterns in the source code 10 through methods like static analysis and suggest improvements to be implemented. Injections at the source code 10 also take the form of reusable and extensible security modules or toolkits that are available to software engineers to automatically provide flexible security when applied. Additionally and/or alternatively, an injection point 200D after the target executable 1008 can be created. In contrast to conventional systems, this injection point is primarily for, but not limited to, finishing touches or tying up loose ends to supplement the other security measures that have already been incorporated in the target executable 1008. Although four injection points 200 are shown and described for exemplary purposes only, those of ordinary skill in the art can appreciate that the advantages of the system and methods described herein can be applied to similar or like compilation phases, including, for example, the incoming edges of the four injection points 200 described above (e.g., a part of the edge of the injection points in addition to the injection points 200).

Although not shown, another exemplary injection point 200 occurs as the abstract syntax tree 1002 is input into an intermediate representation generator 1003. Here, the protection transformations advantageously can be full source-to-source transformations or source-to-IR transformations. As an example, developers of games frequently use utility functions provided by compilers for common tasks, such as initializing or copying variables. These utility functions are well known, have distinct patterns, and are frequently targeted by hackers and cheaters. Accordingly, the injection point 200 as the abstract syntax tree 1002 is input into an intermediate representation generator 1003 enables protection transformations by replacing the utility functions provided by compilers for functionally equivalent custom implementations developed by game security engineers. As another example, variables and functions can have metadata added to in this stage to better inform protection transformations later during code generation. Other examples of exemplary injection points 200 are discussed herein with reference to FIGS. 3-9.

Similarly, although described as injection points 200, the compilation process 1000 includes any application, injection, encryption, encoding, transformation, translation, and/or operation of security measures or protection transformations discussed herein.

Figure 4:
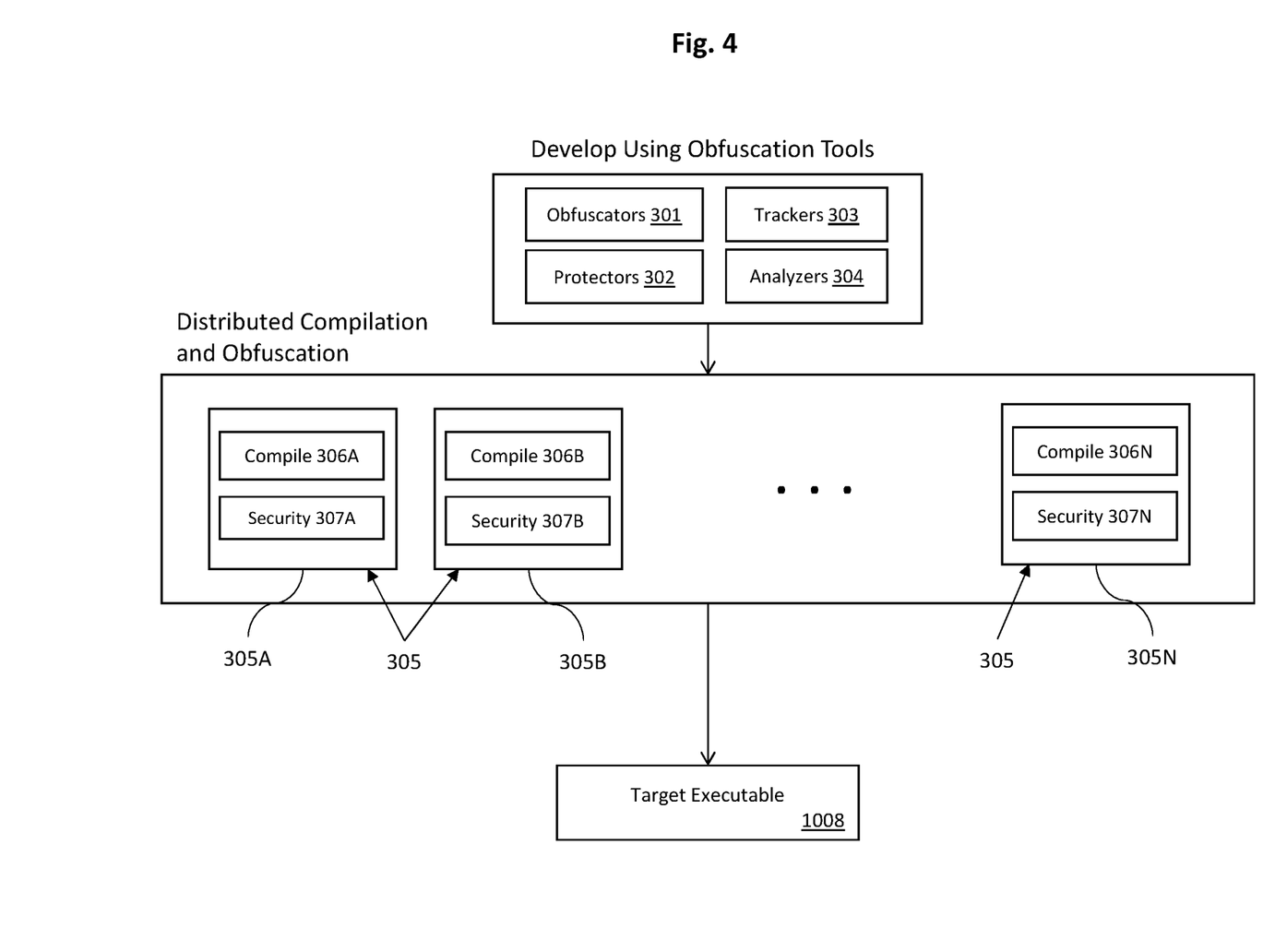
FIG. 4 is an exemplary flow diagram illustrating one embodiment of a security measure injection framework that supports the security-based compilation process of FIG. 2.

FIG. 4 illustrates an exemplary flow diagram depicting the video game development process under some embodiments. Turning to FIG. 4, one or more tools are available to developers including, for example, one or more Obfuscators 301, Protectors 302, Trackers 303, and Analyzers 304. The source code 10 is then passed to a distributed compiler 305 that supports distributed compilation 306A . . . 306N and the application of protection transformations or security measures 307A . . . 307N. Each of the distributed compilers 305A . . . 305N can work independently from the other distributed compilers 305A . . . 305N allowing compilation to be conducted in parallel and greatly increasing compilation speed. Each of the distributed compilers also has the capability to inject security measures 307A . . . 307N, distributing the obfuscation process and accomplishing it during compilation to decrease the time until the target obfuscated executable 1008 is produced for testing and further development. Stated in another way, those of ordinary skill in the art will appreciate that the security measures described herein can be applied at the front-end, middle, back-end, and linking phases of building an application.

In order to allow software engineers to have finer control over their desired security measures and to allow them to create expanded security capabilities, some embodiments include several reusable and extensible tools or modules that software engineers can employ to create highly secure, highly performant video games. These security modules, like the Obfuscators 301, Protectors 302, Trackers 303, and Analyzers 304 can range in function and generality. Some modules are highly general and can be applied to nearly any video game software. Other modules, however, are developed specifically for certain types of video games, such as racing games, first person shooters, role playing games, etc. Modules are also developed specifically for certain types of target instruction set architectures, like x64 or ARM. These modules are independent, extensible, and could be easily applied to new games, automatically applying security benefits while maintaining performance. The modules are also tuned for a distributed video game development environment. As video games mature into vast productions with budgets in the billions, the creation of video games is a collaborative endeavor requiring vast teams of software engineers working in unison on the same software. Software engineers develop independent modules that are loaded into a toolkit or dashboard that would be available to all software engineers. Software engineers could then extend or build upon these modules to collaboratively and iteratively improve and develop these security modules.

In some embodiments, a class of these reusable security modules are Obfuscators 301. Obfuscators 301 are a class of protection transforms for the marking and obfuscation of variables or code. Obfuscators 301, as an illustration, offer new managed data types, e.g., secure integer or secure string, that are protected by the game automatically. Using these new managed data types, a software engineer designates specific variables that are likely to be sensitive (e.g., a player's health, position, score, etc.) as they write source code 10. Furthermore, Obfuscators 301 can also be configured to automatically obfuscate certain variables or code based on how those variables or code are used during compilation or execution. In this way, Obfuscators 301 allow software engineers to precisely target the variables and code that require obfuscation, while also automatically providing obfuscation for certain patterns of compilation or execution that indicate that obfuscation is required. The Obfuscators 301 are developed in order to perform the obfuscation for variables at one or more injection points 200. Obfuscators accomplish their transformations in various ways, for example, by slicing the data in the variables into small fragments and shuffling the fragments in order to make reconstitution of the variable difficult.

Obfuscators 301 similarly provide tools for marking logic and for obfuscating code. Software engineers have the capability to target pieces of logic for obfuscation at several levels. An engineer could mark an entire file, a class, an object, an interface, a function, or even a line or a set of lines of code in a video game as sensitive in order to ensure that the code will be apply protection transformations during compilation. Obfuscators 301 can also automatically target certain sections of logic or code for protection transformations based on operational usage or patterns in compilation. Obfuscators 301, like all other security modules, are integrated during the compilation process 1000 and appear in the same manner as other game code in the target executable 1008. In contrast, commercially available security systems in the prior art employ their security measures after the target executable 1008 has been created and will have specific sections that show obvious signs of obfuscation, attracting the attention of unscrupulous players and providing a clear target for reverse engineering efforts.

In some embodiments, a class of these reusable security modules are Protectors 302. Protectors 302 are a class of security modules that serve as anti-tampering mechanisms. When unscrupulous players attempt to attack data or logic that has been the target of protection transforms, Protectors 302 are designed to react and respond in various ways during runtime, or while the program is executing. For example, Protectors 302 can reverse the attack, by restoring the modified value or logic from a specially saved copy, or protectors 302 can also detect an attack is occurring and respond by admonishing the player or closing the game. Protectors 302 are lightweight and highly adjustable and adaptable. Protectors 302, like all other security measures, are incorporated and injected during compilation, making it more difficult for unscrupulous players to identify. Protectors are also not limited to data or logic that have had protection transforms applied but can also protect unmodified data or logic.

As an example, a Protector 302 performs cyclic redundancy checks (CRC). The CRC Protector 302 receives a range of code to check, a place in the code to execute, and what actions to take in case of a positive or negative evaluation at runtime. When the video game is running, at specified times, CRC Protector looks at the specified bytes in memory, perform the CRC, and take the action specified at compile-time in case of positive or negative evaluations. As another example, a Protector 302 protects the nature of function calls. Generally, function calls are mapped out and pre-determined during the compilation process 1000. Unscrupulous players are able to use static analysis tools to analyze these functions calls without ever having to run the game. The Function-Call Protector automatically converts all function calls to become computed at run-time instead of during compilation. The Function-Call Protector can counteract certain reverse engineering tactics like static analysis, forcing unscrupulous players to analyze the code at runtime. Other examples of Protectors include instructions for detecting the presence of other software, like debuggers or virtual machines, and react accordingly. Protectors can also encode, decode, or restore various types of variables at compile or run-time to counteract reverse engineering efforts. In some embodiments, Protectors include a variety of forms and aims to offer flexible protection.

In some embodiments, a class of these reusable security modules are measurement tools called Trackers 303. Trackers 303 play a vital role in measuring the performance costs of these applied security mechanisms. Modern video games must fit within exceedingly high-performance expectations in order to withstand the fast-paced environment that modern games require. One of the largest costs in applying security measures is the performance cost, especially for any processes that must execute during runtime, like the Protectors 302. Trackers 303, thus, represent another invaluable tool for video game developers who want to improve security measures, while maintaining the high standard of performance. Trackers 303, like other security modules, can be generic and applied to normal functions in the game code or more specific, for example, tracking the performance costs of specific Protectors 302 under different anti-tampering strategies.

A problem with current anti-tampering mechanisms is that they are often one-size-fits-all and often present untenable variations in time in accomplishing their integrity checks. An anti-tampering mechanism that runs quickly on 90% of inputs but inconsistently performs slowly on 10% of inputs does not meet the high-performance expectations required by modern video games and could lead to dropped frames, leading to a poor video game experience for the player. This problem can be diagnosed, tuned, and eliminated with the use of customized Trackers 303 that can be track the performance costs of the discussed security measures.

Trackers 303 are not limited to measuring performance during runtime. As Trackers 303 and the other security modules are closely integrated into the compilation process 1000, Trackers 303 can also measure the performance of the various transformations and processes during compilation. Trackers 303 have the capability to granularly capture the time it takes to create the IR 1004 in the IR Generator 1003, the time it takes to compile the IR 1004 into object files, the time it takes the linker 1007 to link the target executable 1008, and the post-processing time it takes after linking to resolve symbols and canonical values. Each individual process or subprocess of the compilation process 1000 can be meticulously measured in order to identify bottlenecks or to identify how certain changes affect the compilation time. Trackers 303 can help optimize the video game development process to help more secure video games during a shorter period.

In some embodiments, a class of reusable security modules are analytical tools called Analyzers 304. Analyzers 304 allow developers to flexibly examine the compilation process 1000 and the target executable 1008 in order to provide helpful analytics to improve security measures. Analyzers 304 are similar to Trackers 303 but not necessarily fine-tuned to collect time and performance-based information. Analyzers range greatly in function and can operate at one or several of the injection points 200. For example, an Analyzer 304 could operate on the IR 1004 at the Code Optimizer & Generator 1005 to determine code that is rarely executed or frequently executed. Software engineers can then focus the efforts of Protectors 302 on parts of the code that are frequently executed. As another example, an Analyzer 304 could be mobilized during the linking phase 1007 to collect helpful analytics such as counting the number of strings or Windows API functions used in the executable. Strings can provide valuable information to adversaries and contribute to information leakage. Using analyzers, software engineers can minimize information leakage by minimizing or obfuscating the strings in the linker 1007. Similarly, developers can collect information about the Windows API or other operating system functions used in the executable and choose to replace them with more secure variants developed by the developers.

Additionally and/or alternatively, although not shown, in some embodiments, the class of reusable security modules include software virtualizations platforms. The software virtualization platforms allow developers to flexibly adapt the compilation process 1000 and the Code Optimizer & Generator 1005 for an architecture that is specific to a virtual instance of the native code. In other words, the software virtualization platforms can apply virtualization, mutation, and combined mutation of application code with subsequent virtualization. By way of example, the application code can include virtualizations of a secured memory, a secured CPU, one or more secured registers, a secured stack, and so on. The software virtualization can be applied to an instruction, a block of code, a function, or any component of the application code. In some embodiments, the software virtualization can further include nested virtualizations.

With the extra information available during the compilation process 1000, software engineers can create a wide variety of reusable security modules that were not previously possible. Security modules can be configured at one or several injection points 200 depending on the needs of the module. For example, a Protector 302 that performs a CRC can be configured at the Code Optimizer & Generator 1005 to insert the logic to perform a CRC on a certain section of code. At that stage, however, the compilation process 1000 does not have the canonical value, the binary value, that is required to perform the CRC. The Protector 302 can finish its configuration during the linking phase 1007 when the canonical value can be supplied. Security modules can also interact with each other to provide richer functionality, increasing the complexity of the protection of the game code. In this way, security modules can perform their various functions, such as applying their protection transformations or retrieving information for future use, at one or several of the injection points 200 during the compilation process 1000. Security modules can also work in conjunction with other security modules in programmatic and dynamic ways that were not previously possible. For example, Protectors 302 could be configured to work in conjunction with Trackers 303 to dynamically be inserted during the compilation process 1000 in sections of code that are executed most often. This would allow the evolution of security measures that are more automated and require less and less manual configuration by software engineers.

Another benefit of injecting or applying security measures during compilation is increased pace in the game development process. As software engineers develop the source code 10 for a video game, they must continually compile the game to ensure that new additions to the source code 10 are free from errors or bugs. While some errors can be detected by the Syntax Analyzer 1001 during the compilation process 1000 or with the application of unit or regression tests, other errors can only be detected by running tests after the target executable 1008 has been built. This requires software engineers to continually compile and produced target executables 1008 in order to test the additions to the source code 10. As codebases increase in size, the compile time of codebases likewise increases, significantly hampering the video game development process. Software engineers have been able to decrease the compilation and build times by distributing the compilation process 1000 and compiling the video games on several computers in parallel. Much of software is now engineered in order to be conducive to this type of distributed compilation and build in order to decrease development times. Conventional security systems that apply their security measures exclusively on an executable produced after compilation act as a bottleneck to this process because these systems are not configured to be distributed. They must take in the entire monolithic executable as an input, then usually on a single computer, analyze the machine code to apply inferences and try to inject security measures. As the size and complexity of video games increases, this task is consuming increasingly more time, cannot be distributed, and is responsible for a large increase in video game development time In contrast, a system that incorporates security measures during the compilation process 1000 directly can benefit from distributed computing. FIG. 4 displays such a distributed system with a distributed compiler 305 that supports distributed compilation 306A . . . 306N. When source code 10 needs to be compiled, the compilation task is split among the distributed compilers 305A . . . 305N, allowing compilation to be conducted in parallel and greatly increasing compilation speed. Each of the distributed compilers 305A . . . 305N can be executed on specialized hardware that is optimized for parallel processing. Each distributed compiler 305A . . . 305N can take various forms like a separate computer, a server in a rack, a virtualized computer, or more. Each of the distributed compilers 305A . . . 305N possess the capability to apply security measures 307A . . . 307N, distributing the obfuscation process and accomplishing it in parallel during compilation to decrease the time until the target obfuscated executable 1008 is produced for testing and further development. As the encoding, encrypting, and obfuscation can now be accomplished in parallel over a distributed set of compilers, the present invention removes the bottleneck from the video game development process.

Additionally and/or alternatively, the compilation process 1000 can cooperate with a set of compiler and toolchain technologies such as, for example, the LLVM compiler toolchain infrastructure. The LLVM compiler toolchain infrastructure is a popular collection of modular compiler and toolchain technologies that offers many of the core components of the exemplary compilation process 1000 such as the Lexical and Syntax Analyzer 1002, the IR generator 1003, the Code Optimizer and Generator 1005, and Linker 1007. The LLVM compiler toolchain infrastructure offers a selection of front-end compilers that supports the compilation of nearly any programing language. Similarly, the LLVM compiler toolchain infrastructure offers a large variety of back-end compilers that can produce optimized target executables 1008 for nearly any instruction set architecture. The LLVM's modular architecture is supported by a programming-language-agnostic IR that can serve as the intermediary between several of the front end and back-end compilers.

Figure 5:
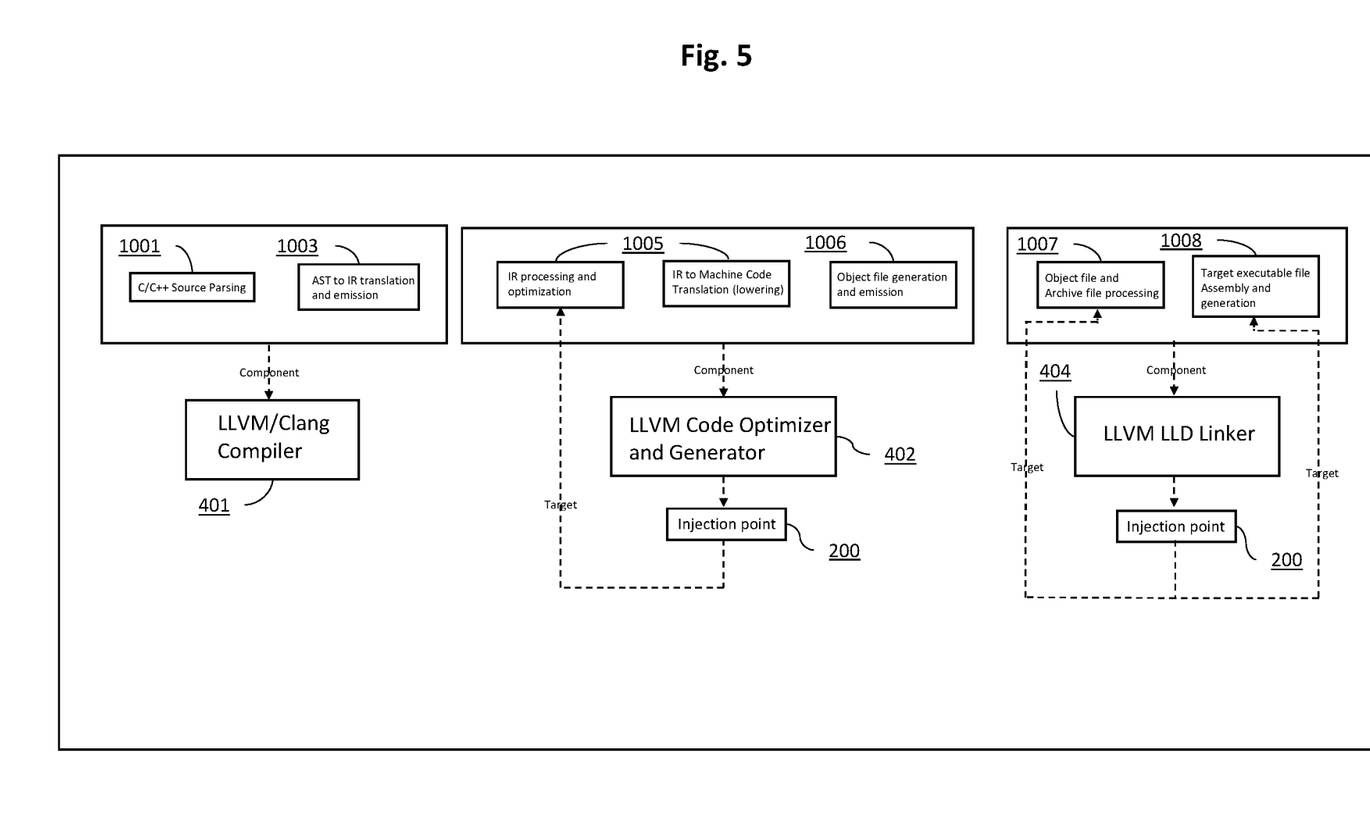
FIG. 5 illustrates an exemplary flow diagram illustrating another embodiment of the security-based compilation process of FIG. 2 using a set of the LLVM compiler and related toolchain technologies.

The LLVM compiler toolchain infrastructure is open source and can be modified to inject or apply security measures at several points. FIG. 5 illustrates a diagram illustrating an exemplary embodiment using the LLVM compiler infrastructure. On the front end, a Clang compiler 401 can be used to parse the C or C++ source code 10, create the abstract syntax tree 1002, then produce the IR 1004. The Clang compiler 401 is a popular front end for the C language family (C, C++, Objective C/C++, OpenCL, CUDA, and Renderscript). The IR 1004 is passed to a LLVM code optimizer and code generator 402 from the LLVM Core libraries. In some embodiments, the LLVM Core libraries can be modified to include injection point 200 of the previously discussed security measures during the IR optimization 1005. The LLVM Core libraries then translate the IR 1004 to the native code 1006, producing object files. On the back end, a LLD linker 403 is used to link the object files and create the executable for the target instruction set architecture 1008. The LLD linker 403 is a drop-in replacement for system linkers that supports ELF, PE/COFF, Mach-O, and WebAssembly. In some embodiments, the LLD linker 403 can be modified to include the injection point 200 to apply security measures during the object and archive file processing 1007 and the generation of the target executable file 1008. After the target executable is created, there can also be further injections to accomplish post-processing tasks such as resolving and creating any symbols or canonical values when necessary.

Figure 6:
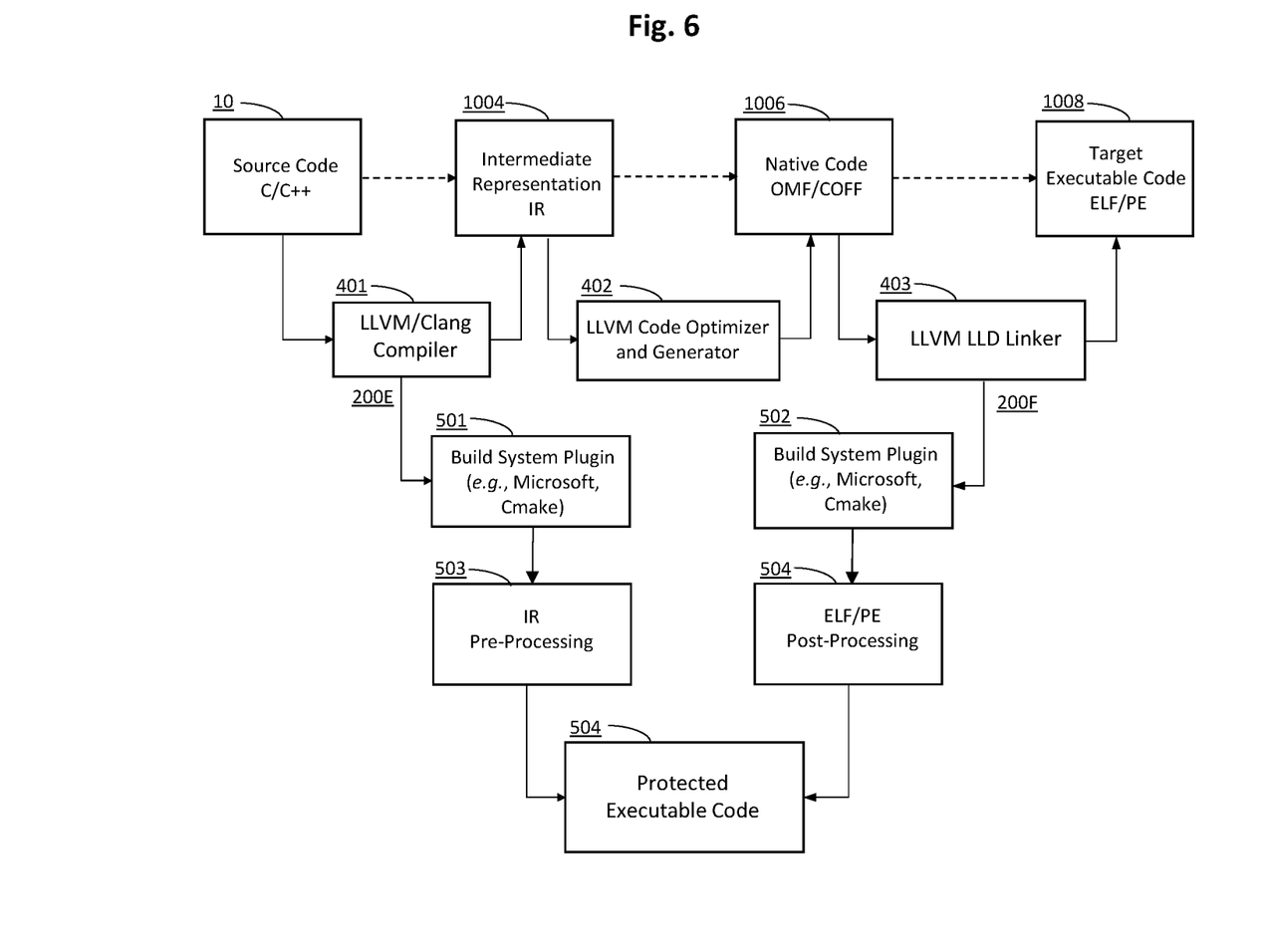
FIG. 6 illustrates an exemplary flow diagram illustrating another embodiment of the security-based compilation process of FIG. 2 in the context of a build system while incorporating post-processing security measures after creation of executable code.

FIG. 6 illustrates another exemplary embodiment using the LLVM compiler toolchain infrastructure in the context of a build system. The system in FIG. 6 incorporates post-processing security measures after creation of executable code. As discussed previously, software engineers begin by writing the source code 10, which in this instance is C/C++, a popular set of general-purpose, procedural programming languages. The source code 10 is passed to the LLVM/Clang Compiler 401 where it is transformed into the IR 1004. The IR 1004 presents a favorable structure for applying code optimizations and for generating the native code 1006 for some applications. This LLVM Code Optimizer and Generator 402 accomplishes this task and creates the native code 1006 in OMF/COFF format, in this instance. OMF, or Relocatable Object Module Format, is a popular object file format that is used primarily for Intel x64 microprocessors, while COFF, or Common Object File Format, is another popular executable format used in Unix and Microsoft Windows-based systems. The native code 1006 is then passed to the LLVM LLD Linker 403 which links the files to create the target executable code 1008. The target executable code needs to be created for all popular formats and in this instance PE, the Portable Executable format, and ELF, the Executable and Linkable Format are created. PE is generally popular on Windows systems, while ELF is popular on Unix-based systems. The source code 10, the IR 1004, the native code 1006, and target executable code 1008 also all represent possible injection points where security measures can be applied.

FIG. 6 includes additional injections points 200E-F, which show connections between the build system and the LLVM/Clang Compiler 401 and LLVM LLD Linker 403. The injection point 200E, similar to injection point 200B, is applied on the IR 1004. The injection point 200E, however, applies security measures on the IR 1004 after the IR has been created but before it has undergone any optimizations, while injection point 200B applies security measures after the IR has undergone optimizations. The injection point 200F applies security measures after the LLVM LLD Linker 403 has completed and when the target executable has already been created.

FIG. 6 also includes a build system which, generally, is the system responsible for collecting all the necessary components required to create the target executable code. The requirements and duties of a build system can vary greatly depending on the type and complexity of the target executable code. For example, a build system for a modern and highly complex video game that contains several packages of source code 10 and libraries in binary form might also need to accommodate a distributed compilation system as described in FIG. 4. The build system in FIG. 6 uses, as an example, CMake, a popular cross-platform and open-source tool for managing build processes. By using CMake or similar software like the Microsoft Build Engine (MSBuild), software engineers can easily create project files for different platforms, such as Solution files for Microsoft Windows or Makefiles for GNU.

The build system allows for plugins 501 that can be used to apply security measures. After the IR 1004 is generated at the LLVM/Clang Compiler 401, the build system plugin 501 accomplishes various pre-processing tasks 503 on the IR 1004. For example, transformations, encodings, and obfuscations that rely on the game logic can be applied on the IR 1004 as well as the extraction of all strings and canonical values. Similarly, after the target executable code 1008 is created at the LLVM LLD Linker 403, another build system plugin 502 accomplishes various post-processing tasks 504 on the ELF/PE executable. For example, during post-processing 504, the build system plugin 502 can resolve and create any symbols or canonical values as necessary. Other security measures, such as transformations, obfuscations, or encodings can further take place in this post-processing 504. Although FIG. 5 and FIG. 6 feature the LLVM compiler toolchain infrastructure, other compiler infrastructures like Microsoft Visual C++ (MSVC) could be used when desired.

Figure 7:
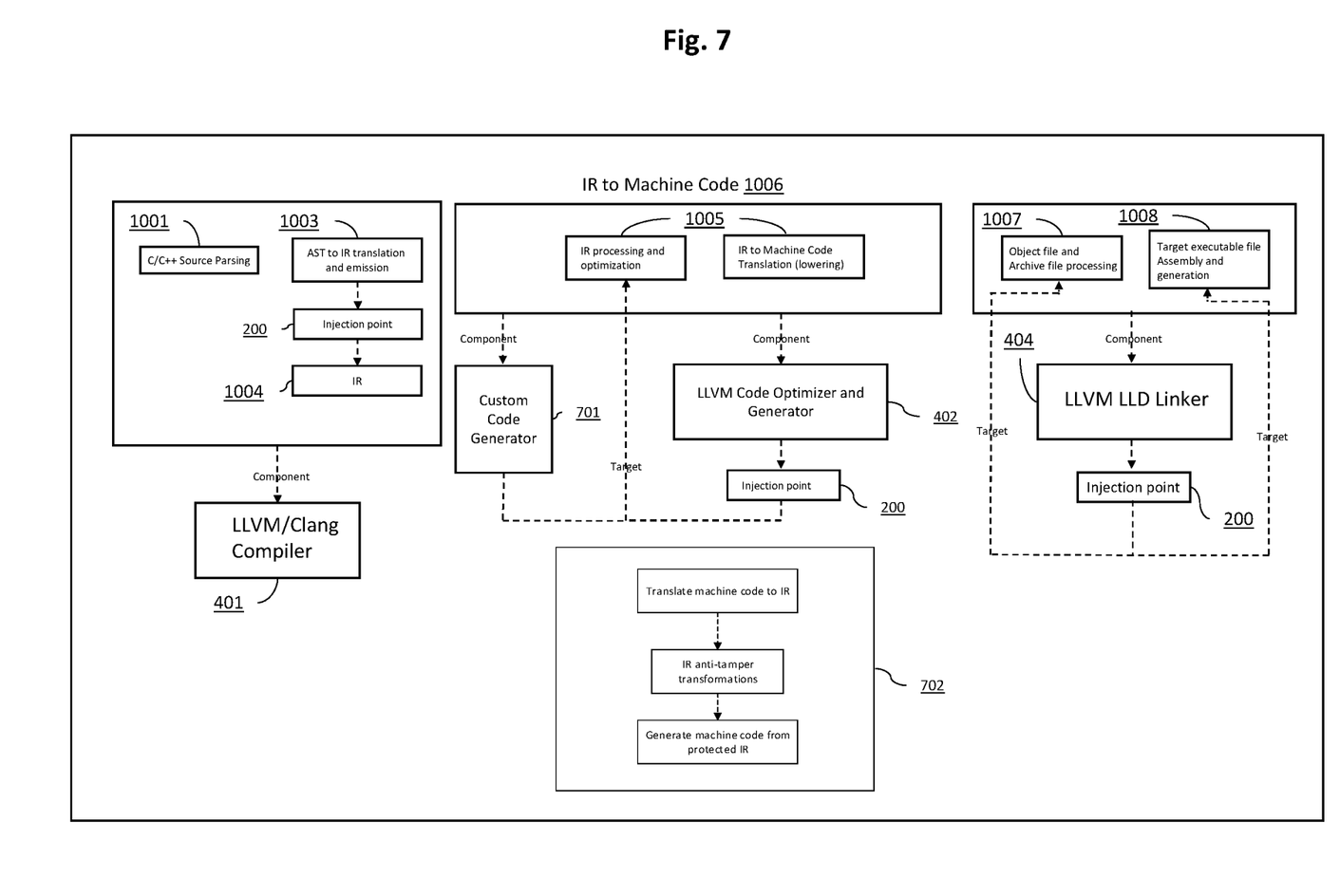
FIG. 7 illustrates an exemplary flow diagram illustrating another embodiment of the security-based compilation process of FIG. 5 using a set of the LLVM compiler and related toolchain technologies.

FIG. 7 illustrates a diagram illustrating an alternative embodiment of FIG. 5 using the LLVM compiler infrastructure. As before, on the front end, a Clang compiler 401 can be used to parse the C or C++ source code 10, create the abstract syntax tree 1002, then produce the IR 1004. As shown in FIG. 7, and as previously described, an injection point 200 can be included between the generation of the abstract syntax tree 1002 prior to the generation of the IR 1004.

As discussed with reference to FIG. 5, in some embodiments, the IR 1004 is passed to a LLVM code optimizer and code generator 402 from the LLVM Core libraries. In some embodiments, the LLVM Core libraries can be modified to include injection point 200 of the previously discussed security measures during the IR optimization 1005. The LLVM Core libraries then translate the IR 1004 to the native code 1006, producing object files.

Additionally and/or alternatively, as shown in FIG. 7, a custom code generator 701 can receive the IR 1004. Advantageously, instead of directly producing the native code 1006, the custom code generator 701 can use the IR 1004 to generate a virtualization of the native code 1006. In other words, the custom code generator 701 can generate code for an architecture that is specific to that software's virtual machine instance, such as for use with the software virtualization platforms disused above.

In some embodiments, the compilation process 1000 advantageously can be adapted to obfuscate and protect third-party libraries that are shipped as object code. For example, as shown in FIG. 7, a convertor 702 can receive the object code and translate the object code back to the IR 1004. Any of the protection mechanisms discussed herein can be applied to the IR 1004, which is then compiled back to machine code prior to being linked by the linker 404.

On the back end, the LLD linker 404 is used to link the object files and create the executable for the target instruction set architecture 1008. The LLD linker 404 is a drop-in replacement for system linkers that supports ELF, PE/COFF, Mach-O, and WebAssembly. In some embodiments, the LLD linker 404 can be modified to include the injection point 200 to apply security measures during the object and archive file processing 1007 and the generation of the target executable file 1008. After the target executable is created, there can also be further injections to accomplish post-processing tasks such as resolving and creating any symbols or canonical values when necessary. Although shown for exemplary purposes, each of the injection points 200 shown in FIG. 7 enable developers to insert/modify anti-tampering logic and the present system can include additional injection points 200 as desired.

Figure 8:
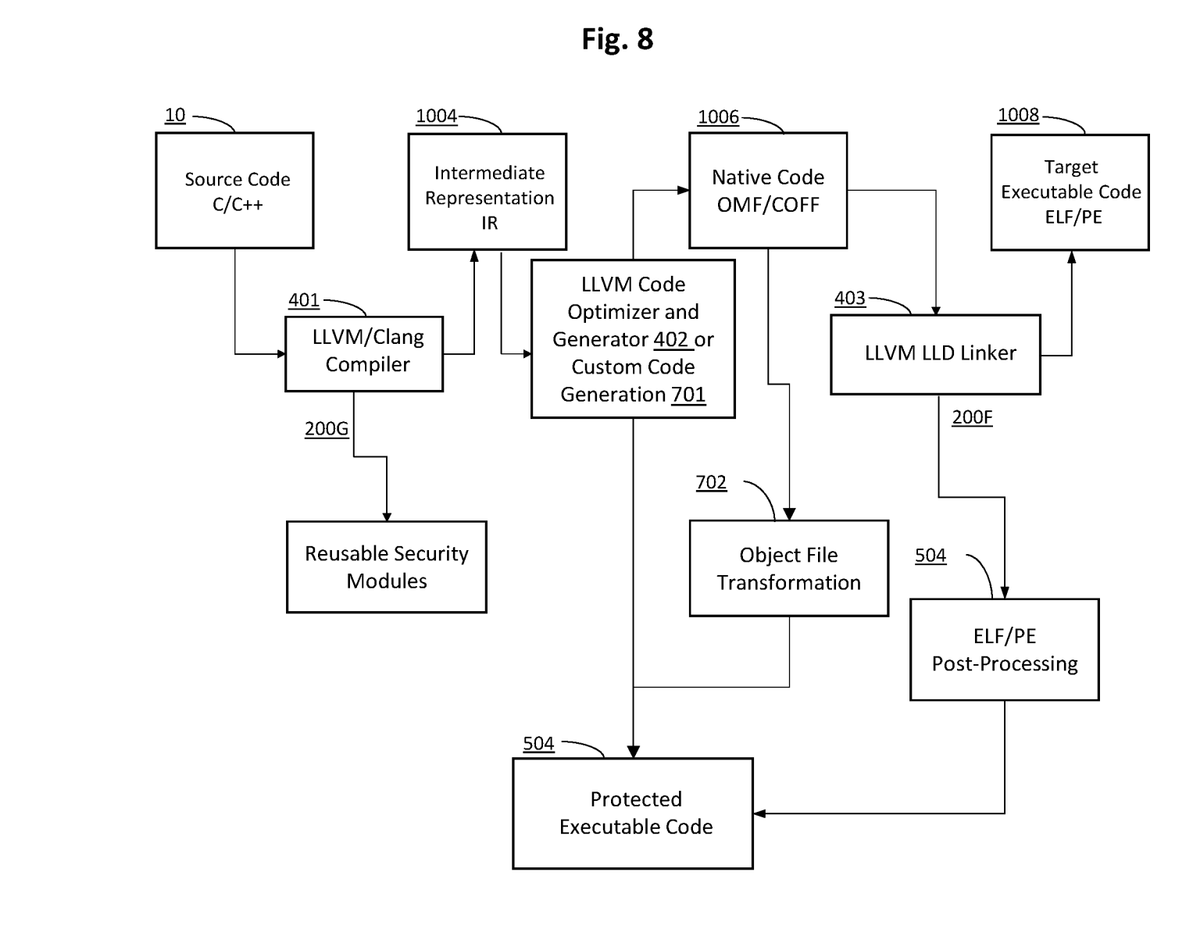
FIG. 8 illustrates an exemplary flow diagram illustrating another embodiment of the security-based compilation process of FIG. 6 in the context of a build system while incorporating post-processing security measures after creation of executable code.

FIG. 8 illustrates another exemplary embodiment of FIG. 6 using the LLVM compiler toolchain infrastructure in the context of a build system. As discussed previously, software engineers begin by writing the source code 10, which in this instance is C/C++, a popular set of general-purpose, procedural programming languages. Compared to the embodiment shown in FIG. 6, FIG. 8 illustrates an exemplary injection point 200G to access the source code 10 being passed to the LLVM/Clang Compiler 401 prior to the transformation into the IR 1004. Advantageously, protections can be applied prior to the generation of the IR 1004. For example, the reusable security modules shown can pre-process the abstract syntax tree 1002 (shown in FIG. 3), modify the abstract syntax tree 1002, and post-process the abstract syntax tree 1002, for example, to replace the utility functions provided by compilers for functionally equivalent custom implementations developed by game security engineers.

The native code 1006 (or a virtualization of the native code 1006, such as described with reference to FIG. 5, or a transformed object file 702 in native code) is then passed to the LLVM LLD Linker 403 which links the files to create the target executable code 1008. The target executable code needs to be created for all popular formats and in this instance PE, the Portable Executable format, and ELF, the Executable and Linkable Format are created. PE is generally popular on Windows systems, while ELF is popular on Unix-based systems. The source code 10, the IR 1004, the native code 1006, and target executable code 1008 are also all components where security measures and/or protections transforms can be applied by inserting injection points or generating custom code, such as for an architecture that is specific to that software's virtual machine instance discussed herein.

The build system allows for plugins 501 that can be used to apply security measures. After the IR 1004 is generated at the LLVM/Clang Compiler 401, the build system plugin 501 can perform various pre-processing tasks 503 on the IR 1004. For example, transformations, encodings, and obfuscations that rely on the game logic can be applied on the IR 1004 as well as the extraction of all strings and canonical values. Similarly, after the target executable code 1008 is created at the LLVM LLD Linker 403, another build system plugin 502 can perform various post-processing tasks 504 on the ELF/PE executable. For example, during post-processing 504, the build system plugin 502 can resolve and create any symbols or canonical values as necessary. And in some embodiments, finalization, post-processing, resolving, and creating additional symbols or canonical values can be applied, leveraging an injection point 200 built into the linker 403. Other security measures, such as transformations, obfuscations, or encodings can further take place in this post-processing 504.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A security-based method for compiling an executable from a source file, comprising:
   converting the source file into a sequence of tokens via a lexical analyzer;
   generating an abstract syntax tree from the sequence of tokens;
   producing an intermediate representation of the generated abstract syntax tree;
   performing optimizations on the intermediate representation;
   transforming the produced intermediate representation into machine code;
   creating an executable by linking the machine code with one or more libraries; and
   incorporating at least one security measure during the security-based method for compiling the executable, wherein said incorporating comprises injecting a class of reusable security modules, the class including at least two protectors, each protector in operable communication with each other to perform at least one cyclic redundancy check during runtime of the compiled executable.

2. The method of claim 1, wherein said incorporating the at least one security measure comprises applying protection transforms between said generating the abstract syntax tree and said producing an intermediate representation of the generated abstract syntax tree.

3. The method of claim 2, wherein said applying protection transforms comprises replacing one or more utility functions provided by a compiler with functionally equivalent custom implementations.

4. The method of claim 1, wherein said incorporating the at least one security measure comprises applying protection transforms prior to said converting the source file into a sequence of tokens.

5. The method of claim 1, wherein said incorporating the at least one security measure comprises applying protection transforms between said performing optimizations on the intermediate representation and said transforming the produced intermediate representation into machine code.

6. The method of claim 1, wherein said incorporating the at least one security measure comprises applying protection transforms during said creating the executable by linking the machine code with one or more libraries.

7. The method of claim 1, wherein said incorporating the at least one security measure comprises applying protection transforms to the created executable.

8. The method of claim 1, wherein said transforming the produced intermediate representation into machine code comprises generating, via a custom code generator, a virtualization of the machine code.

9. The method of claim 1, further comprising:
   translating the machine code back into a second intermediate representation;
   applying protection transforms to the second intermediate representation; and
   compiling the second intermediate representation with the applied protection transforms back into the machine code for said creating the executable.

10. A non-transitory nonvolatile computer program product comprising a processor-readable medium having a sequence of instructions stored thereon, which, when executed by the processor, causes the processor to execute a security-based method for compiling an executable from a source file, the sequence of instructions comprising:
    instructions for converting the source file into a sequence of tokens via a lexical analyzer;
    instructions for generating an abstract syntax tree from the sequence of tokens;
    instructions for producing an intermediate representation of the generated abstract syntax tree;
    instructions for performing optimizations on the intermediate representation;
    instructions for transforming the produced intermediate representation into machine code;
    instructions for creating an executable by linking the machine code with one or more libraries; and instructions for incorporating at least one security measure during the security-based method for compiling the executable, wherein said instructions for incorporating comprises instructions for injecting a class of reusable security modules, the class including at least two protectors, each protector in operable communication with each other to perform at least one cyclic redundancy check during runtime of the compiled executable.

11. The computer program product of claim 10, wherein said instructions for incorporating the at least one security measure comprises instructions for applying protection transforms between said instructions for generating the abstract syntax tree and said instructions for producing an intermediate representation of the generated abstract syntax tree.

12. The computer program product of claim 11, wherein said instructions for applying protection transforms comprises instructions for replacing one or more utility functions provided by a compiler with functionally equivalent custom implementations.

13. The computer program product of claim 10, wherein said instructions for incorporating the at least one security measure comprises instructions for applying protection transforms prior to said instructions for converting the source file into a sequence of tokens.

14. The computer program product of claim 10, wherein said instructions for incorporating the at least one security measure comprises instructions for applying protection transforms between said instructions for performing optimizations on the intermediate representation and said instructions for transforming the produced intermediate representation into machine code.

15. The computer program product of claim 10, wherein said instructions for incorporating the at least one security measure comprises instructions for applying protection transforms during said instructions for creating the executable by linking the machine code with one or more libraries.

16. The computer program product of claim 10, wherein said instructions for incorporating the at least one security measure comprises instructions for applying protection transforms to the created executable.

17. The computer program product of claim 10, wherein said instructions for transforming the produced intermediate representation into machine code comprises instructions for generating, via a custom code generator, a virtualization of the machine code.

18. The computer program product of claim 10, said sequence of instructions further comprising:
  instructions for translating the machine code back into a second intermediate representation;
  instructions for applying protection transforms to the second intermediate representation; and
  instructions for compiling the second intermediate representation with the applied protection transforms back into the machine code for said creating the executable.

19. A distributed system for security-based compiling of an executable from a source file, comprising:
  a data network; and
  one or more distributed compilers, each distributed compiler in operative communication with the one or more distributed compilers over the data network and comprising a non-transitory nonvolatile computer program product comprising a processor-readable medium having a sequence of instructions stored thereon, which, when executed by the processor, causes the processor to execute the sequence of instructions comprising for receiving an allocated portion of the source file, converting the allocated portion of source file into a sequence of tokens via a lexical analyzer, generating an abstract syntax tree from the sequence of tokens, producing an intermediate representation of the generated abstract syntax tree, performing optimizations on the intermediate representation, transforming the produced intermediate representation into machine code, creating an executable by linking the machine code with one or more libraries, and incorporating at least one security measure during the security-based method for compiling the executable, wherein said incorporating comprises injecting a class of reusable security modules, the class including at least two protectors, each protector in operable communication with each other to perform at least one cyclic redundancy check during runtime of the compiled executable.

20. The distributed system for security-based compiling of claim 1, wherein at least one of the one or more distributed compilers includes an LLVM compiler toolchain infrastructure.

* * * * *